United States Patent
Jauch et al.

(10) Patent No.: US 6,528,726 B1
(45) Date of Patent: Mar. 4, 2003

(54) ASSEMBLY FOR CABLE CONDUITS OF WORKSTATION FURNITURE

(75) Inventors: Ala Jauch, Dinkelsbühl (DE); Markus Schmidt, Betzdorf (DE); Werner-Josef Kaiser, Elkenroth (DE)

(73) Assignee: Otto Lampertz GmbH & Co. KG, Wallemenroth (DE)

( * ) Notice: Subject to any disclaimer, the term of this patent is extended or adjusted under 35 U.S.C. 154(b) by 0 days.

(21) Appl. No.: 09/807,912

(22) PCT Filed: Oct. 14, 1999

(86) PCT No.: PCT/EP99/07732

§ 371 (c)(1),
(2), (4) Date: Jul. 27, 2001

(87) PCT Pub. No.: WO00/24103

PCT Pub. Date: Apr. 27, 2000

(30) Foreign Application Priority Data

Oct. 21, 1998 (DE) .......................... 198 48 511

(51) Int. Cl.[7] .................................................. H02G 3/04
(52) U.S. Cl. ..................... 174/68.3; 174/68.1; 174/101
(58) Field of Search ................................ 174/68.3, 68.1, 174/70 R, 99 R, 101

(56) References Cited

U.S. PATENT DOCUMENTS 3,927,698 A * 12/1975 Johannsen ................... 138/162
4,907,767 A * 3/1990 Corsi et al. .................. 138/162
5,359,143 A * 10/1994 Simon .......................... 138/157
5,949,025 A   9/1999 Nagai et al.
6,107,575 A * 8/2000 Miranda ....................... 174/101
6,198,043 B1 * 3/2001 Hoffmann ..................... 174/48
6,313,405 B1 * 11/2001 Rinderer ...................... 174/68.3

FOREIGN PATENT DOCUMENTS

| DE | 3426064 C1 | * 1/1986 | ............ H02G/3/04 |
| DE | 196 10 347 | 4/1997 | |
| EP | 0 446 475 | 9/1991 | |
| EP | 453392 A2 | * 10/1991 | ............ H02G/3/04 |
| EP | 0 767 521 | 4/1997 | |
| FR | 2654561 A1 | * 5/1991 | ............ H02G/3/04 |

* cited by examiner

Primary Examiner—Dean A. Reichard
Assistant Examiner—Jinhee Lee
(74) Attorney, Agent, or Firm—Pauley Petersen Kinne & Erickson

(57) ABSTRACT

An assembly for cable conduits of workstation furniture, having a plurality of different profile sections which can be inserted into one another. Connecting elements are shaped on or in the inner and/or outer side of the profile sections. The assembly has three different profile sections which can be easily assembled in order to construct vertical cable conduits which can be connected to a column of the furniture frame, thus offering attachment possibilities for additional structures in or on the inner and outer sides of the cable conduit.

21 Claims, 2 Drawing Sheets

ASSEMBLY FOR CABLE CONDUITS OF WORKSTATION FURNITURE

BACKGROUND OF THE INVENTION

1. Field of the Invention

This invention relates to a kit for cable conduits in a piece of workstation furniture, having several different profiled sections which can be put together and on or in which connecting elements are formed on an inside and/or an outside.

2. Description of Related Art

Such a kit is known from German Patent Reference DE 196 10 347 C1. The connecting elements formed on the inside are strips or grooves and are used for fastening cables and built-in devices. Connection and counter-connection elements of complicated design are formed on free longitudinal edges of the profiled sections for connecting the profiled sections with the cable conduit. The plugged-together cable conduits are primarily used as horizontal conduits, with front ends that can be connected with vertical columns of the furniture frame, and have only a comparatively small receiving space.

SUMMARY OF THE INVENTION

It is one object of this invention to provide a kit of the type mentioned above but with cable conduits that can be rapidly and simply put together with profiled sections having simple connecting elements, which can be attached to vertical columns of a furniture frame.

In accordance with this invention, this object is achieved with a kit that comprises three different profiled sections:

a) profiled sections for connection with the columns, essentially having a U-shaped cross section, wherein the base leg is formed on the outside of the column receptacle, connecting grooves are formed in outsides of the lateral legs and the inside of the base leg has a fastening groove formed thereon;

b) profiled sections on the back wall, essentially having a U-shaped cross section, wherein the inside of the base leg has a fastening groove formed thereon, and connecting grooves are formed in outsides of the lateral leg; and c) profiled connecting sections of essentially meander-shaped cross section for connecting a profiled section for connection with a column with a profiled section on the back wall, wherein receiving grooves are alternatingly formed on the inside and the outside, and the longitudinal edges transition into connecting shoulders which can be inserted into the connecting grooves of the profiled sections for connection with the column and the profiled sections on the back wall.

With the profiled element for connection with the column an attachment of the cable conduit on the column over a large surface and extending over an entire length of the cable conduit is achieved with the receiver in the column. The profiled sections on the back wall and the profiled connecting sections, which have connecting grooves, can be easily connected with each other. Fastening and attachment possibilities for built-in devices, contact strips and the like are provided on the insides and/or outsides of the assembled cable conduit with the fastening grooves and receiving grooves of the profiled sections. Also, the attachment of horizontal cable conduits to the vertical cable conduit connected with a column is simplified. A closed cable conduit can be assembled from four profiled sections, which meets all requirements for its employment in a piece of work station furniture.

In accordance with a preferred embodiment, connecting grooves in the lateral legs of the profiled sections for connection with the column and with the profiled sections on the back wall have T-shaped cross sections, and those on the insides of the profiled sections which are for connection with the columns and of the profiled sections on the back wall, as well as at least a portion of the receiving grooves of the profiled connecting sections, have T-shaped cross sections.

If the connecting shoulders of the profiled connecting sections have bores and can be screwed together with the connecting grooves of the profiled sections for connection with the columns and with the profiled sections on the back wall by means of screws, the profiled sections meeting each other can be screwed together in a simple manner, and the installation of devices in the cable conduit is simplified.

Further fastening possibilities are created because locking strips with a row of slits can be pushed into the connecting grooves of the profiled sections for connection with the columns and with the profiled sections on the back wall and therein can be securely maintained. Suspension hooks, which have been inserted into the front of receiving grooves of profiled sections extending vertically with respect to them, can be suspended in the slits. In an inner corner area open screw channels are formed in the area of the connecting grooves of the of the profiled sections for connection with the columns and with the profiled sections on the back wall.

In place of a second profiled connecting section for the cable conduit the lateral legs of the profiled sections for connection with the columns and of the profiled sections on the back wall terminate in connecting receiver grooves, which terminate flush with the outsides of the lateral legs. A flexible cover is inserted into the facing receiver grooves at the ends of the lateral legs of the profiled sections for connection with the columns and of the profiled sections on the back wall and therein are maintained.

An interlocking reception of the column in the column receiver of the profiled section for connection with the columns is achieved because the profiled sections for connection with the columns have hollow chambered strips formed on the outside in the end areas of the base leg, which border the column receiver. The facing lateral walls of these hollow chambered strips continuously expand the column receiver toward the exterior and have facing holding strips. An easy attachment possibility for the cable conduits is provided with the holding strips because holding slides, which are held by the holding strips and can be suspended by means of hooked strips in slits of the facing lateral walls of the column, can be inserted into the column receivers. It is possible to utilize a plurality of holding strips in the longitudinal direction. In this regard, in one embodiment, the holding slides can be fixed in place by means of arresting screws in the column receiver, so that they cannot be displaced. The holding strips of the holding slides fixed in place are thus arranged in the same way as the distribution of the slits in the column and positioned so that the cable conduit suspended in the column is held at several places along its longitudinal extension.

BRIEF DESCRIPTION OF THE DRAWINGS

This invention will be explained in view of exemplary embodiments represented in the drawings wherein.

DESCRIPTION OF PREFERRED EMBODIMENTS

Figure 1:
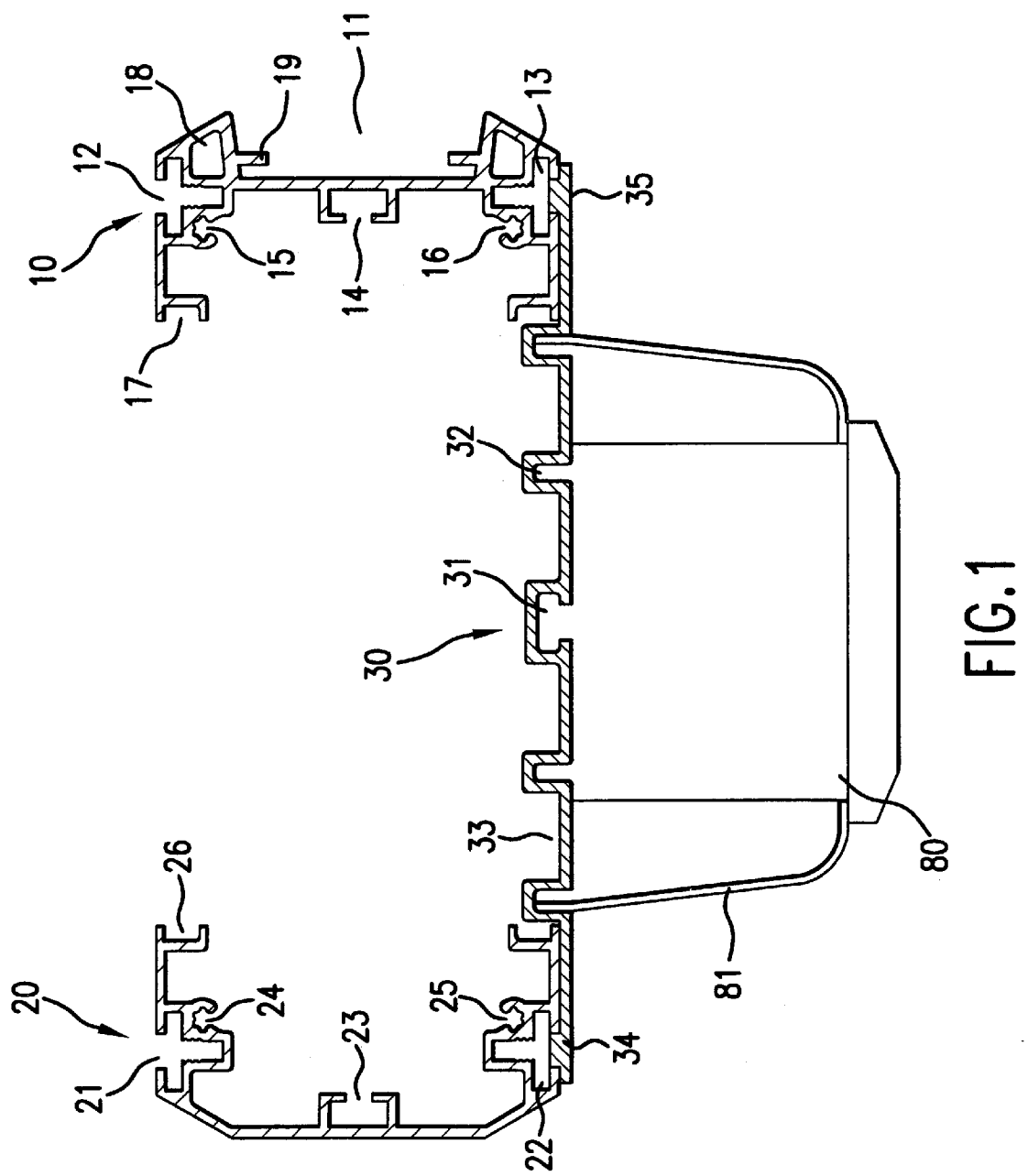
FIG. 1 is a cross-sectional view of an open cable conduit assembled from a profiled section for connection with a column, a profiled section on the back wall and a profiled connecting section, in cross section.
Figure 2:
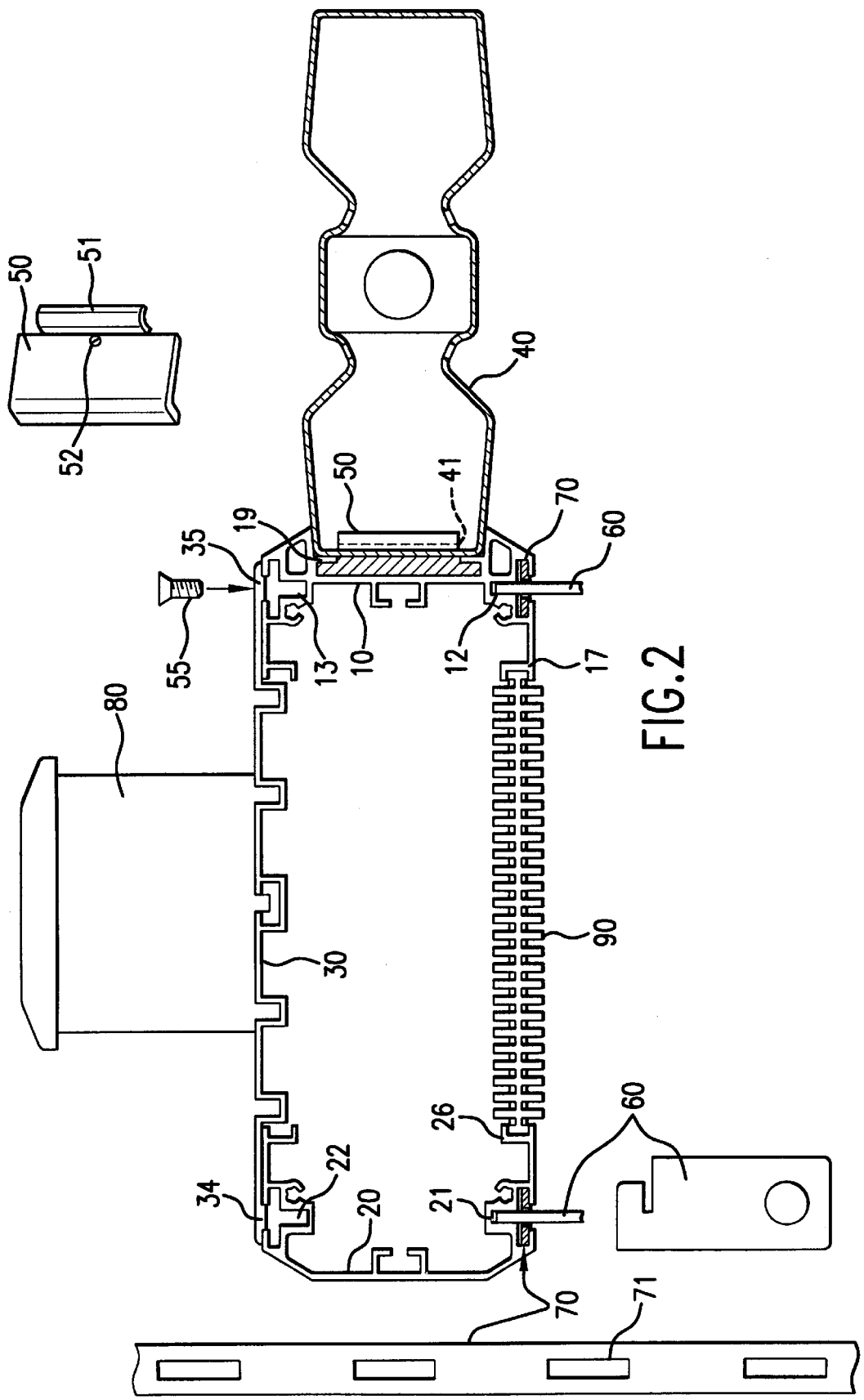
FIG. 2 is a cross-sectional view of a cable conduit fastened on a column, having a profiled section for connection with a column, a profiled section on the back wall, a profiled connecting section and a flexible cover, which is used as the second connection between the profiled section for connection with a column and the profiled section on the back wall.

In FIG. 1, an essentially U-shaped profiled section 11 for connection with a column and an essentially U-shaped profiled section 20 on the back wall form the lateral legs of an open U-shaped cable conduit. A profiled connecting section 30 forms the base leg of the cable conduit. The outside of the profiled section 10 for connection with a column is, with the hollow chambered strips 18, a column receiver 11 with holding strips 19 formed thereon, into which a vertical column 40 of the furniture frame can be interlockingly inserted, as shown in FIG. 2. Holding slides 50 are used for fastening, which can be pushed behind the holding strips 19 and positioned by means of arresting screws 52. The lateral wall of the column 40 facing the column receiver 11 has a row of horizontal slits 41, in which the hooked strips 51 of the holding slides 50 can be suspended when they are positioned in the same distribution as the slits 41 on the profiled section 10 for connection with the column.

T-shaped connecting grooves 12 and 13 are formed in the outsides of the profiled section 10 for connection with the column, into which connecting shoulders 34 and 35 of a profiled connecting section 30 can be inserted and fixed by means of screws 55, as shown in FIG. 2. Open screw conduits 15 and 16 are formed in the transition areas between the base leg and the lateral leg of the profiled section 10 for connection with the column on the profiled elements forming the connecting grooves 12 and 13, which offer additional connecting possibilities, particularly on a front of the cable conduit.

The lateral legs of the profiled section 10 for connection with the column terminate in receiving grooves 17. The same also applies to the lateral legs of the essentially U-shaped profiled section 20 on the back wall with the receiving grooves 26 and the connecting grooves 21 and 22 formed therein. In FIG. 1, the connecting groove 22 receives the connecting shoulder 34 of the profiled connecting section 30. The transition areas from the lateral legs to the base leg of the profiled section 20 on the back wall are beveled. The inside of the base leg of the profiled section 20 on the back wall has a fastening groove 23 formed therein, the same as the base leg of the profiled section 10 for connection with the column with the fastening groove 14. Open screw conduits 24 and 25 are formed in the area of the transitions from the lateral legs to the base leg, which offer further fastening possibilities in the front.

The profiled connecting sections 30 essentially have a meander-shaped cross section with receiving grooves 31, 32 and 33 alternating on the inside and the outside, which can be used for attaching built-in devices and structures, such as contact strips 80 or the like, with covers 81.

As FIG. 2 shows, the side of the cable conduit which is open in FIG. 1, can be closed by means of a flexible cover 90, which is inserted into facing receiving grooves 17 and 26 of the profiled section 10 for connection with the column and of the profiled section 20 on the back wall. The flexible covers 90 can also only extend over partial sections of the longitudinal extent of the cable conduit for introducing and/or leading out cables by pressing the cover 90 together at certain places of the cable conduit. In this case the connecting grooves 12 and 21 of the profiled section 10 for connection with the column and of the profiled section 20 on the back wall remain free, so that they can receive locking strips 70 with a row of slits 71. Suspension hooks 60, which are inserted into the front of connecting grooves of profiled sections of a horizontal cable conduit, can be inserted into the slits 71. Horizontal cable conduits can be connected in this way, wherein the distribution of the slits 71 in the locking strips 70 determines the connecting places.

The three different profiled sections, the profiled sections for connection to a column and the profiled sections on the back wall and the profiled connecting sections, allow the construction of closed and partially open vertical cable conduits by means of a simple and positive fastening possibility on a vertical column 40 of the furniture frame. Also, the connection of the profiled sections with each other can be simply and quickly performed. The cable conduit offers attachment and fastening options on its inside and outside, wherein the simple connection of horizontal cable conduits is of particular importance, because this simplifies the guidance of cables in the workstation furniture by means of the employment of flexible covers in the area of the connecting places.

What is claimed is:

1. In a kit for cable conduits in a piece of workstation furniture, having different profiled sections which can be assembled and on or in which connecting elements are formed on at least one of an inside and an outside, the improvement comprising:

a first profiled section (10) of the profiled sections for connection with a column, having a first U-shaped cross section with a first base leg formed on a first outside of a column receiver (11), first connecting grooves (12, 13) having T-shaped cross sections formed in second outsides of first lateral legs and first inside of the first base leg having a first fastening groove (14);

a second profiled section (20) of the profiled sections on a back wall, having a second U-shaped cross section, wherein a second inside of a second base leg has a second fastening groove (23) and second connecting grooves (21, 22) having T-shaped cross sections are formed in third outsides of second lateral legs;

a third profiled section (30) of the profiled sections having a longitudinally extending, alternating raised and lowered section for connecting the first profiled section (10) for connection with the column and with the second profiled section (20) wherein receiving grooves (31, 32, 33) having T-shaped cross sections are alternatingly formed on a third inside and a fourth outside of the third profiled section (30), and longitudinal edges of the third profiled section (30) transition into connecting shoulders (34, 35) which can be inserted into the first and the second connecting grooves (12, 13; 21, 22) of the first profiled section (10) for connection with the column and of the second profiled section (20) for connection with the column; and the T-shaped cross sections of the first connection groves (12, 13) and the second connecting grooves (21, 22) receiving locking strips (70) having a row of slits (71) lockable into at least one of the first connecting grooves (12, 13) and the second connecting grooves (21, 22) and securely maintainable therein, and further fastenable with suspension hooks (60) suspended in the slits

(71) thereby creating a positive connection among the suspension hooks (60), the locking strips (70) and one of the first connecting grooves (12, 13) and the second connecting grooves (21, 22), and the T-shaped cross sections further and alternatively receiving screws (55).

2. In the kit in accordance with claim 1, wherein in an inner corner area, a plurality of open screw channels (15, 16; 24, 25) are formed near the first and the second connecting grooves (12, 13; 21, 22) of the first profiled section (10) for connection with the column and with the second profiled section (20) on the back wall.

3. In the kit in accordance with claim 2, wherein the first lateral legs of the first profiled section (10), for connection with the column and the second lateral legs of the second profiled section (20) terminate in connecting second and third receiving grooves (17, 26), respectively, which each terminate flush with the first and the second lateral legs, respectively.

4. In the kit in accordance with claim 3, wherein a transition area between the second lateral legs of the second profiled section (20) is beveled.

5. In the kit in accordance with claim 4, wherein the first profiled section (10) for connection with the column has a hollow chambered strip (18) formed in an end area of the first base leg, which borders the column receiver (11), and facing lateral walls forming the hollow chambered strip (18) continuously expand the column receiver (11) and have facing holding strips (19).

6. In the kit in accordance with claim 5, wherein a holding slide (50) which is held by the facing holding strips (19) is suspended by a hooked strip (51) mounted within a slit (41) in an intermediate lateral wall between the facing lateral walls and is inserted into the column receiver (11).

7. In the kit in accordance with claim 6, wherein the holding slide (50) is fixed by an arresting screw (52) in the column receiver (11).

8. In the kit in accordance with claim 7, wherein connecting shoulders (34, 35) of the third profiled section (30) have bores and can be screwed together with one of the first connecting grooves (12, 13) and one of the second connecting grooves (21, 22) with screws (55).

9. In the kit in accordance with claim 8, wherein a flexible cover (90) is inserted into and maintained within facing receiver grooves (17, 26) of the first profiled section (10) and the second profiled section (20), respectively.

10. In the kit in accordance with claim 9, wherein contact strips (80) and installation outlets for built-in devices are attached on the third profiled section (30), and on the first profiled section (10).

11. In the kit in accordance with claim 1, wherein at least a portion of the receiving grooves (31, 32, 33) of the third profiled section (30) each has a T-shaped cross section.

12. In the kit in accordance with claim 1, wherein in an inner corner area, a plurality of open screw channels (15, 16; 24, 25) are formed near the first and the second connecting grooves (12, 13; 21, 22) of the first profiled section (10) for connection with the column and with the second profiled section (20) on the back wall.

13. In the kit in accordance with claim 1, wherein the first lateral legs of the first profiled section (10), for connection with the column and the second lateral legs of the second profiled section (20) terminate in connecting second and third receiving grooves (17, 26), respectively, which each terminate flush with the first and the second lateral legs, respectively.

14. In the kit in accordance with claim 1, wherein a transition area between the second lateral legs of the second profiled section (20) is beveled.

15. In the kit in accordance with claim 1, wherein the first profiled section (10) for connection with the column has a hollow chambered strip (18) formed in an end area of the first base leg, which borders the column receiver (11), and facing lateral walls forming the hollow chambered strip (18) continuously expand the column receiver (11) and have facing holding strips (19).

16. In the kit in accordance with claim 1, wherein a holding slide (50) which is held by facing holding strips (19) is suspended by a hooked strip (51) mounted within a slit (41) in an intermediate lateral wall between facing lateral walls of the column (40) and is inserted into the column receiver (11).

17. In the kit in accordance with claim 1, wherein a holding slide (50) is fixed by an arresting screw (52) in the column receiver (11).

18. In the kit in accordance with claim 1, wherein connecting shoulders (34, 35) of the third profiled section (30) have bores and can be screwed together with one of the first connecting grooves (12, 13) and one of the second connecting grooves (21, 22) with screws (55).

19. In the kit in accordance with claim 1, wherein locking strips (70) with a row of slits (71) are pushed into one of the first connecting grooves (12, 13) and one of the second connecting grooves (21, 22) and are securely maintained therein, and suspension hooks (60) are suspended in the slits (71).

20. In the kit in accordance with claim 1, wherein a flexible cover (90) is inserted into and maintained within facing receiver grooves (17, 26) of the first profiled section (10) and the second profiled section (20), respectively.

21. In the kit in accordance with claim 1, wherein contact strips (80) and installation outlets for built-in devices are attached on the third profiled section (30), and on the first profiled section (10).

\* \* \* \* \*